United States Patent [19]

Eguchi et al.

[11] Patent Number: 5,529,808
[45] Date of Patent: Jun. 25, 1996

[54] STAMPABLE GLASS FIBER REINFORCED THERMOPLASTIC RESIN AND METHOD OF PRODUCING THE SAME

[75] Inventors: Kunihiko Eguchi, Chiba; Masafumi Komatsu, Okayama; Seiji Hanatani, Chiba; Yuichi Uchida, Chiba; Tomoshige Ono, Chiba; Tadahiro Wakui, Chiba, all of Japan

[73] Assignee: Kawasaki Steel Corporation, Japan

[21] Appl. No.: 290,354

[22] Filed: Aug. 15, 1994

[51] Int. Cl.⁶ .............................. B05D 3/00; B05D 1/36
[52] U.S. Cl. .................... 427/389.7; 427/389.8; 427/384; 427/532; 427/557; 427/559; 427/561; 427/196; 427/202; 427/299; 427/337
[58] Field of Search .............................. 264/109; 427/532, 427/557, 559, 561, 196, 202, 299, 337, 384, 389.7, 389.8

[56] References Cited

FOREIGN PATENT DOCUMENTS

0491204A2  5/1992  European Pat. Off. .
WO 91/10702  7/1991  WIPO .

*Primary Examiner*—Patrick J. Ryan
*Assistant Examiner*—Richard Weisberger
*Attorney, Agent, or Firm*—Austin R. Miller

[57] ABSTRACT

A glass fiber reinforced polymer which excels in mechanical properties and is suitable for use in a large-sized structural members, formed from a dispersion liquid by dispersing reinforcement glass fibers and particulate thermoplastic resin in a surfactant-containing aqueous medium in which bubbles of air are dispersed, forming a sheet-like web on a porous support plate, and applying heat and pressure to form a sheet. The reinforcement glass fibers include a silane coupling agent while the matrix resin has functional groups bonded to the silane coupling agent. The concentration of said functional groups is higher in the regions adjacent the surfaces of said reinforcement glass fibers than in regions farther removed therefrom, and said concentration progressively decreases in the direction away from said reinforcement glass fibers.

7 Claims, 3 Drawing Sheets

STAMPABLE GLASS FIBER REINFORCED THERMOPLASTIC RESIN AND METHOD OF PRODUCING THE SAME

BACKGROUND OF THE INVENTION

1. Field of the Invention

The present invention relates to a glass-fiber-reinforced thermoplastic resin composite stampable material which can be shaped by stamping and which excels in strength and modulus of elasticity, as well as in moldability, and, in addition, exhibits a high degree of uniformity of color. The invention also is concerned with a method of producing such a stampable material.

2. Description of the Related Arts

Techniques have been known for fabricating composite materials in which fibers having a high modulus of elasticity, such as glass fibers, are added to a matrix material such as a thermoplastic resin, so as to obtain high degrees of strength and rigidity in addition to the formability inherently possessed by the thermoplastic resin. This type of composite material, referred to as glass-fiber-reinforced thermoplastic composite material, is used in structural members which are required to have high degrees of rigidity and strength and reduced weight. Among known composite materials of the kind described, plate or sheet-type composite materials, which contain comparatively long fibers, are attracting attention for use as materials of large-sized structural members. Such materials are usually shaped after being heated to a temperature above the softening point of the matrix resin. A process analogous to a web-making machine of the type used in the papermaking industry has been noticed as a representative method for forming plate or sheet-type composite materials suitable for production of large-sized structural members by stamping using a press.

In general, the web-making process includes the steps of dispersing long glass fibers and particles of thermoplastic resin in an aqueous solution of a surfactant containing fine bubbles of gas, holding the dispersion liquid on a porous supporting plate so as to form a sheet-like web in a manner similar to preparation of paper sheet, and applying heat and pressure to the web to prepare a solidified and dense sheet-like glass-fiber-reinforced thermoplastic composite material. This technique is disclosed, for example, in Japanese Patent Publication No. 2-48243 and Japanese Patent Laid-Open No. 60-158227.

The present invention pertains to a stamping glass-fiber-reinforced thermoplastic resin composite material produced by a web-making-type process. Excellent mechanical properties such as strength and modulus of elasticity of the stampable material owe to the fact that the load applied to the resin matrix which inherently has low levels of strength and modulus of elasticity is sufficiently borne by the glass fibers which possess high levels of strength and modulus of elasticity. The sharing of the load by the glass fibers is realized through the interface between the fibers and the resin, i.e., through the exterior surfaces of the fibers. Therefore, mechanical properties of the stampable material and structural members formed from this material are improved when the fibers exhibit greater wettability to the matrix resin and when the bonding strength between the fibers and the matrix resin is high.

Unfortunately, however, mechanical properties of known stampable materials produced by web-making-type processes are still unsatisfactory.

As a measure for improving wettability and bonding strength, a method has been disclosed in Japanese Patent Laid-Open No. 63-41128 in which a silane coupling agent is added to the web. However, it has been recognized that mere addition of a silane coupling agent cannot provide sufficiently high wettability and bonding strength between the glass fibers and the matrix resin.

It might be possible to lower the melt-viscosity of the thermoplastic resin, i.e., to use a resin having a smaller molecular weight, in order to enhance the wettability and the interface as a measure for improving mechanical properties. Such a measure, however, undesirably impairs mechanical properties due to, for example, embrittlement of the matrix resin, although it improves wettability in some cases.

Improvement of bonding strength at the interface between glass fibers and matrix resin has also been discussed in the field of glass-fiber-reinforced thermoplastic resin composite material intended for use in an entirely different technology, namely as an injection molding material. In this field of technology, a method has been known in which, when the thermoplastic resin is a non-polar resin such as polypropylene, the polypropylene is denatured by maleic acid or maleic anhydride. For example, Japanese Patent Laid-Open No. 48-68640, as well as Japanese Patent Publication No. 51-10265, discloses a method in which denatured polypropylene and glass fibers are melted and uniformly mixed by kneading in an extruder such as a screw extruder so as to improve bonding between the glass fibers and the denatured polypropylene at their interface, thereby producing a composite material which excels both in strength and elasticity, This known technique, however, cannot be used in the production of stampable material by a web-making process or the like, because such a process does not include any way of uniformly mixing the glass fibers and the thermoplastic resin, through melting and kneading or otherwise. A mere addition of an additive such as denatured polypropylene cannot and would not provide any appreciable improvement of strength or, alternatively, causes a large fluctuation of strength, because the bonding strength and wettability at the interface between the glass fibers and the thermoplastic resin cannot be significantly improved due to the fact that there is no kneading step.

Another problem encountered in the production of stampable material through a web-making process resides in that, when the additive has been colored, unevenness of coloring appears on the surface of the sheet due to inferior dispersion of such additive. A more uniform dispersion of denatured polypropylene might theoretically be attainable by refining the denatured polypropylene before the latter is added. Refining of the denatured polypropylene, however, causes other problems such as dropping of fine particles of denatured polypropylene through the pores of the porous support plate or clogging of the pores with the fine particles.

The aforementioned known technique disclosed in, for example, Japanese Patent Laid Open No. 48-68640 and Japanese Patent Publication No. 51-10265, in which glass fibers are uniformly dispersed in a resin by melting and kneading, also suffers from still another disadvantage. When an additive such as denatured polypropylene is added, reduction of the mechanical properties of the matrix resin due to brittleness of the additive itself becomes noticeable as the content of the additive increases, all at the cost of enhancement of bonding at the interface which might serve to improve the mechanical properties of the composite material. Thus, there is a limit to the permissible amount of addition of the additive, and this limit is an impediment to significant improvement of mechanical properties of the composite material.

In the production of a stamping material using papermaking process, an attempt has been made to use, as the thermoplastic resin particles for forming the matrix resin, particles which have been denatured in advance. In such an attempt, however, deterioration of the mechanical properties due to brittleness of the denatured thermoplastic resin itself becomes noticeable at the cost of improvement in the mechanical properties which is offered by enhanced bonding at the interface after preparation of the composite material. This attempt, therefore, also fails to provide any remarkable increase in the mechanical properties of the stamping material.

SUMMARY OF THE INVENTION

Accordingly, an object of the present invention is to provide a novel stampable polymeric glass-reinforced material, as well as a method of producing the same, which has enhanced wettability and bonding strength and can nevertheless be formed by a web-making or filtration process. This may be done by creating a strong bonding effect of a functional group (an additive which contributes to bonding at the interface) capable of coupling with a silane coupling agent, which is bondable to glass fibers, without causing unevenness of color distribution, while attaining excellence in fluidity and mechanical properties, thereby overcoming the difficult problems of the known art.

Throughout an intense study for achieving the above-described object of the invention, the present inventors have found that the bonding strength at the interface between the glass fibers and the resin is maximized in accordance with this invention, while impairment of the mechanical properties of the matrix resin due to presence of functional groups is minimized, by a novel stampable material having special features and by a novel process by which it is made.

More specifically, according to the invention, a process is used in which the stampable material is formed by preparing a dispersion liquid by dispersing reinforcement glass fibers and particulate thermoplastic resin in a surfactant-containing aqueous medium in which fine bubbles of air are dispersed, forming a sheet-like web on the dispersion liquid by supporting the dispersion liquid on a porous support plate, and applying heat and pressure to the resulting web so as to solidify the web into the form of a sheet.

The important improvement in accordance with this invention comprises providing the reinforcement glass fibers with a silane coupling agent in an amount ranging from about 20 to 70 wt % of the total stampable material, while the matrix resin in the stampable material is also provided with functional groups which are bondable to the silane coupling agent. The matrix resin has a special gradient of concentration of the functional groups wherein the concentration of functional groups in the resin is higher in the regions near the surfaces of the reinforcement glass fibers and progressively decreases in the regions removed from the reinforcement glass fibers and positioned more toward the inside portion of the matrix resin.

According to the present invention, it is thus possible to obtain a stampable material having remarkably improved mechanical properties.

Preferably, the mean number of the functional groups bondable to the silane coupling agent in the matrix resin of the stampable material is from about $3.0 \times 10^{17}$ to $6.0 \times 10^{19}$ per gram of the matrix resin. It is also preferred that the matrix resin has such a gradient of concentration of the functional groups that the concentration in the regions of the polymeric matrix near the surfaces of the reinforcement glass fibers has a value which is ten or more times greater than the mean number of concentration throughout the resin matrix, and that mean number of functional groups ranges from about $3.0 \times 10^{19}$ to $1.2 \times 10^{21}$ per gram of matrix resin, the functional group concentration progressively decreasing toward the inside of the body of the matrix resin, away from each glass fiber. The term "region near the surface of the glass fiber" means a region which is substantially at or within about 10 µm from the surface of each glass fiber. Concentration of the functional groups must be sufficiently high at this region. Generally, concentration of functional groups is preferably high in the region within 30 µm from the surface of each glass fiber. The concentration of functional groups at the point 50 µm away from the surface of each glass fiber may be high.

Examples of thermoplastic resins used in the practice of the present invention include polyethylene, polypropylene, polystyrene, polyvinyl chloride, polyethylene terephthalate, polycarbonate, polyamide and polyacetal. A copolymer, a graft compound or a blend of the resins listed above, e.g., an ethylene-vinyl chloride copolymer, ethylene-vinyl acetate copolymer or an ethylene-butadiene-acrylonitrile copolymer, can also or alternatively be used.

Preferably, the functional group is at least one group selected from the group consisting of an acid anhydride group, a carboxyl group and a hydroxyl group.

We also have discovered a method suitable for producing the novel stampable material having the enumerated excellent mechanical properties.

Thus, according to the method, an important improvement comprises the fact that the reinforcement glass fibers have been treated with a silane coupling agent. The glass fibers are present in an amount ranging from about 20 to 70 wt % of the total stampable material.

In one form of the method in accordance with the present invention, the thermoplastic resin particles comprise a mixture of resin particles including particles of a thermoplastic resin which does not contain in its molecule any functional group bondable to the silane coupling agent (referred to as "thermoplastic resin A", hereinafter) and a thermoplastic resin which contains in its molecule a functional group bondable to the silane coupling agent (referred to as "thermoplastic resin B"), the thermoplastic resin B having been fused to the surfaces of the particles of the thermoplastic resin A and containing in its molecule a functional group bondable to the silane coupling agent; holding the dispersion liquid on a porous support plate so as to form a sheet-like web by using a process analogous to the aforementioned papermaking technique; and applying heat and pressure to the web thereby solidifying the web in a form of a sheet. According to this method, since the thermoplastic resin "B" containing functional groups is fused beforehand to the surface of the thermoplastic resin "A" which does not contain any functional group, the interfaces between the glass fibers silane coupling agent and the matrix thermoplastic resin are uniformly wetted so as to achieve uniform and high-strength bonding between the glass fibers and the matrix resin "B".

It would be possible to add the thermoplastic resin containing the functional groups by directly throwing into the dispersion liquid. Such a method, however, cannot provide sufficiently large strengthening effect because of lack of uniformity of the wetting and bonding characteristics at the interface when the sheet is formed.

According to an alternative embodiment of the method of the invention, it is possible to create a stampable material having excellent mechanical properties by impregnating the web with an emulsion of a thermoplastic resin (referred to as "thermoplastic resin C" hereinafter) containing in the molecule thereof a functional group that is bondable to the thermoplastic resin, and which has a particle size not greater than about 2 µm, and applying heat and pressure to the web thereby solidifying the web in a form of a sheet. The web is impregnated with the resin C as an emulsion of the resin C is applied or sprayed thereto, so that the resin emulsion is uniformly deposited and bonded to the surfaces of the glass fibers, thus improving the wettability and bonding characteristics at the interface between the glass fibers and the resin, thereby contributing to improvement in strength. We have found that the strengthening effect is particularly remarkable when the particle size of the emulsion of thermoplastic resin "C" is about 2 µm or less. This is considered to be attributable to the fact that, when the particle size of the emulsion is greater than about 2 µm the deposition of the emulsion to the glass fibers is rendered nonuniform, impairing the strengthening effect.

We have also found that a stampable material having further improved mechanical properties is obtainable by simultaneously using these two types of methods, using the combination of "A" plus "B" with resin "C."

According to the production methods of the invention, it is possible to produce a stampable material in which the concentration of the functional groups in the matrix resin in the stampable material has such a gradient that the concentration of the functional groups that are bondable to the silane coupling agent of the glass fibers is greatest in the region close to the surfaces of the reinforcement glass fibers, but progressively decreases at regions farther away from the surfaces of the glass fibers, namely, toward the inner portion of the matrix resin.

The content of the functional groups contained in the matrix resin and bondable to the silane coupling agent in the matrix resin of the stampable material is preferably controlled within the range from about $3.0 \times 10^{17}$ to about $6.0 \times 10^{19}$, this being the ratio of the number of the functional group to the weight of the thermoplastic resin in a gram.

It is also preferred that the concentration of the functional groups in the thermoplastic resin B (which is fused to the surfaces of the thermoplastic resin A) or of the thermoplastic resin C (which is in emulsion form and is bondable directly to the silane coupling agent) is controlled within the range from about $3.0 \times 10^{19}$ to $1.2 \times 10^{21}$ in terms of the number of the functional group to the weight of the thermoplastic resin B or C in grams.

It is also preferred that the thermoplastic resin A (which does not contain any functional group bondable to the glass fibers), the thermoplastic resin B (which does have such bondable groups) and the thermoplastic resin C (which does have such bondable groups) are polypropylene, and that the functional groups present in resins B and C are at least one kind selected from the group consisting of acid anhydride groups, carboxyl groups and hydroxyl groups.

These and other objects, features and advantages of the present invention will become clear from the following detailed description of the invention when the same is read in conjunction with the accompanying drawings, which are not intended to define or to limit the scope of the invention except as provided by the appended claims.

DETAILED DESCRIPTION OF THE INVENTION

Figure 1:
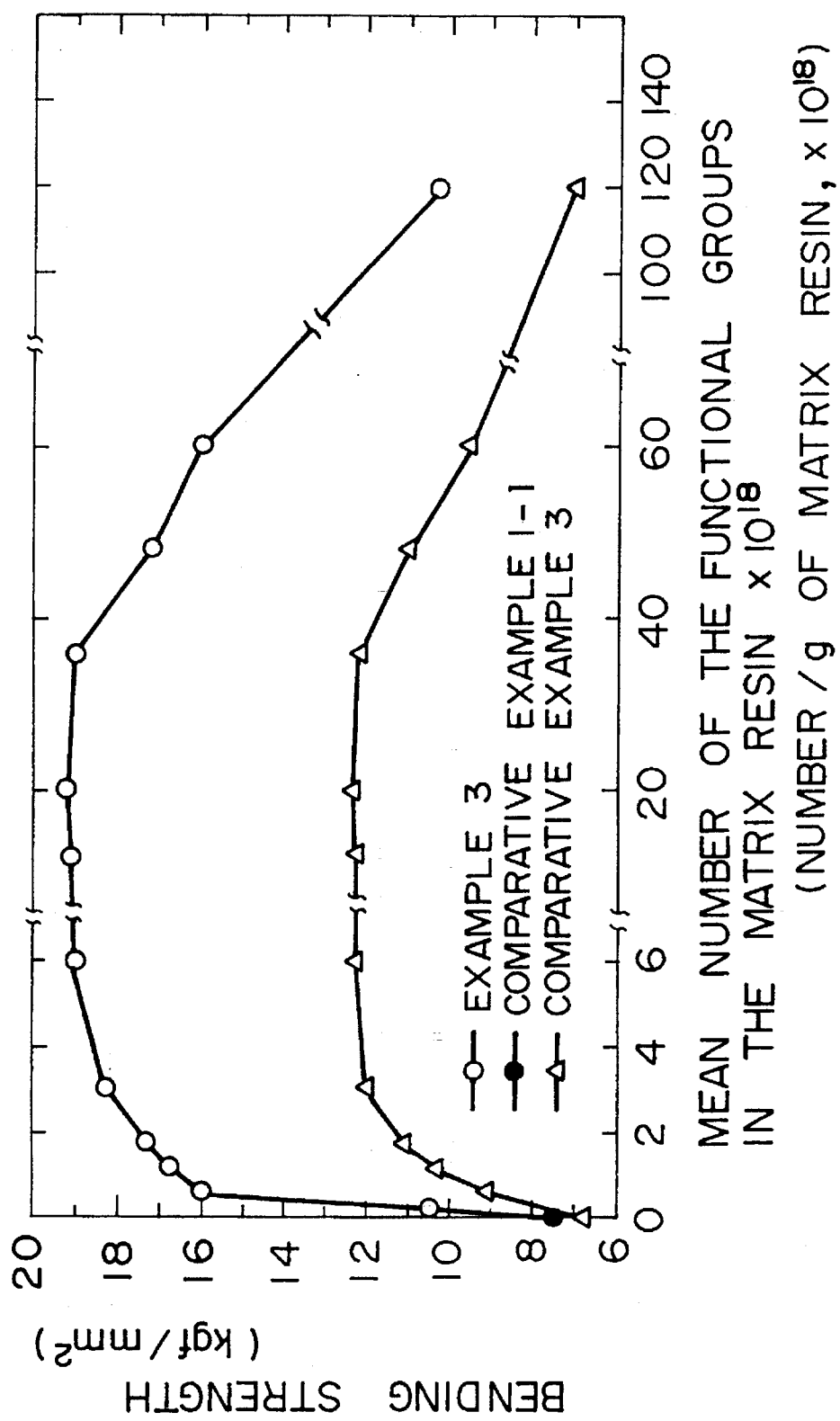
FIGS. 1 and 2 are graphs showing relationships between the mean number of functional groups in a matrix resin and the bending strength of the resulting resin, for a variety of matrix resins including Examples prepared pursuant to the invention and Comparative Examples.

Turning now to the reinforcement glass fibers used in accordance with this invention, in order that the glass fibers provide sufficient strengthening effect without reduction of fluidity during forming of the stampable material, the mean length of the glass fibers preferably ranges from about 6 to 50 mm. The improvement of reinforcement effect is insufficient when the glass fibers are too short, whereas excessive length of the glass fibers impairs the fluidity of the material during the process of forming of the stampable material. In order that an appreciable reinforcement effect is attained, it is preferred that the mean diameter of the glass fibers ranges from about 5 to 30 µm.

The glass fibers are present in the stampable material such that the ratio of the weight of the glass fibers to the weight of the thermoplastic resin falls within the range from 20/80 to 70/30. When the content or weight ratio of the glass fibers is too small, the reinforcement effect is correspondingly small, whereas, when the weight ratio is excessively large, it becomes difficult or even impossible to impregnate the glass fibers uniformly with the thermoplastic resin, so that the mechanical properties of the stampable material are impaired due to voidage in the stampable material.

According to the present invention, it is essential that the surfaces of the glass fibers be provided with a silane coupling agent and, as required, also with sizing agent to be defined hereinafter. The silane coupling agent serves to provide excellent wettability and reactivity between the glass fibers and the thermoplastic resin containing functional groups, while the sizing agent serves to control the degree of separation or opening of the glass fibers.

Various types of silane coupling agents can be used, such as the vinyl silane type, aminosilane type, epoxysilane type, methacrylsilane type, chlorosilane type and mercaptosilane type, among which agents of the aminosilane type or epoxysilane type are very suitably used. The provision of the glass fibers with the silane coupling agent can be conducted in various known ways such as the "dry" method in which an aqueous solution of the silane coupling agent is applied to the glass fibers while the glass fibers are agitated. Another method called the "spray method" may be used, in which an aqueous solution of silane coupling agent is sprayed on glass fibers heated to a high temperature, and dipped in an aqueous solution of a silane coupling agent. The amount of the silane coupling agent preferably ranges from about 0.001 to 0.3 wt %, more preferably from about 0.005 to 0.2 wt %, of the weight of the glass fibers. Improvement of mechanical properties of the stampable product is not appreciable when the amount of the silane coupling agent is below about 0.001 wt %, while silane coupling agent in excess of about 0.3 wt % causes a saturation of improvement of mechanical properties while impairing the operability of the glass fibers when the latter are dispersed.

The glass fibers may be used as independent filaments or in the form of a fiber bundle in which the glass fiber filaments are bundled into fibers. It is also possible to use the glass fibers in the form of a mixture of discrete filaments or as fiber bundles. The degree of opening of the fibers can be controlled by suitably adjusting the kind and quantity of any sizing agent that may be added.

When the glass fibers are present in the form of fiber bundles, it is necessary that sizing agent are present, which are fibers that are soluble or materially insoluble in the surfactant-containing aqueous medium. They prevent the bundle of fibers from opening during the manufacturing process.

Examples of sizing agent suitably used in the practice of the invention are agents of the epoxy-type, urethane-type, polyolefin-type and melamine-type. Suitable ratios of the sizing agent to the glass fibers preferably range from about 0.1 to 1.5 wt % and more preferably from about 0.2 to 1.3 wt %. When the content of the sizing agent is less than about 0.1 wt %, the fibers tend to open into discrete filaments in the course of the process. Conversely, use of the sizing agent in excess of about 1.5 wt % may reduce wettability and bondability between the silane coupling agent and the thermoplastic resin (thermoplastic resin B or C) containing the functional groups.

Some types of reinforcement glass fibers which tend to be opened into filaments have to be treated with water-soluble sizing agent. Examples of such sizing agent are agents of the polyethylene oxide type and polyvinyl alcohol type. The amount of the sizing agent to the glass fibers preferably ranges from about 0.03 to 0.3 wt %, more preferably from about 0.05 to 0.2 wt %. When the amount of the sizing agent is below about 0.03 wt %, the fibers tend to open before they are put into the aqueous medium, thus impairing operability. Conversely, use of the sizing agent in excess of about 0.3 wt % hampers opening of the fibers in the manufacturing process.

The use of fiber bundles as the reinforcement glass fibers enhances fluidity of the matrix resin, thus contributing to improvement of formability of the stampable material. When the bundle includes too many filaments, however, the mechanical strength of the stampable material may be reduced due to reduction of the total outer surface area of the whole glass fibers.

A description will now be given of the various thermoplastic resins.

Examples of the thermoplastic resin A, containing essentially no significant amount of functional groups bondable to the silane coupling agent of the glass fibers, in the present invention include polyethylene, polypropylene, polystyrene, polyvinyl chloride, polyethylene terephthalate, polycarbonate, polyamide or polyacetal, or a copolymer, a graft compound and/or blend of the resins listed above, e.g., an ethylene-vinyl chloride copolymer, ethylene-vinyl acetate copolymer or ethylene-butadiene-acrylonitrile copolymer. Among these resin materials, polypropylene is most suitable.

A thermoplastic resin having functional groups bondable to the silane coupling agent, i.e., a thermoplastic resin B or C, may be prepared by denaturing the above-listed resin materials of the resin A with a suitable compound such as an acid or epoxy compound. When polypropylene is used as the thermoplastic resin, maleic acid, maleic anhydride or an acrylate can suitably used as the denaturing agent. A denaturing agent which provides an acid anhydride group or a carboxyl group as the functional group is most suitable. It is also possible to use a material obtained by further denaturing an acid-denatured resin or material which provides, as the functional group, a hydroxyl group through saponification after polymerization with vinyl acetate. It is also possible to use a material which provides, as the functional group, an amino group through denaturing with acrylamide, methacrylamide or the like. The functional group also may be of aziridine type, epoxy type or silane type.

The bond between the silane coupling agent and the functional group may be a hydrogen bond or a covalent bond. Any type of bond which contributes to improvement of bondability between the matrix resin and the reinforcement glass fibers treated with the silane coupling agent can be employed.

Preferably, the number of the functional group ranges from about $3.0 \times 10^{17}$ to $6.0 \times 10^{19}$, more preferably from about $1.2 \times 10^{18}$ to $3.0 \times 10^{19}$, in terms of the number of the functional group to the weight in grams of the matrix resin. When the number of the functional groups is below about $3.0 \times 10^{17}$, the improvement of mechanical properties of the stampable material is not remarkable, because of insufficiency of bonding between the surfaces of the glass fibers and the silane coupling agent. Conversely, when the number of the functional group exceeds about $6.0 \times 10^{19}$, the effect of improving the bonding between the glass fibers and the coupling agent is saturated and suffers disadvantage from the viewpoint of cost, as well as undesirable coloring of the stampable material and impairment of mechanical properties due to embrittlement of the matrix resin.

According to the present invention, the functional groups are distributed with such a gradient or local concentration that the concentration of the functional groups is highest at the regions contacting the reinforcement glass fibers and progressively decreases toward the inside of the matrix resin, thus contributing to further improvement of mechanical properties. The term "local concentration" of the functional groups means a configuration wherein the thermoplastic resin B or C, containing the functional group in its molecule is selectively present in the regions near the surfaces of the reinforcement glass fibers. One of the methods for realizing such a local concentration of the functional group is to use, as the component of the web, a particle composite including the particles of the thermoplastic resin A free of the functional group and the thermoplastic resin B having the functional groups and fused to the surfaces of the particles of the thermoplastic resin A. Another method is to spray an emulsion of the thermoplastic resin C having functional groups onto a web formed by using the thermoplastic resin A. It is also possible to use these two procedures in combination.

Particles of thermoplastic resin (thermoplastic resin A) may be used for producing a web by the so-called paper-making-type method. The resin composite obtained by fusing thermoplastic resin B to the surfaces of the particles of thermoplastic resin A must be also particulate. The particles of thermoplastic resin A may be particles after polymerization, or particles obtained by dissolving resin pellets in a solvent and then precipitating the resin (chemical grinding), or particles obtained by mechanical grinding. The particle size of the resin composite is preferably about 50 to 2000 µm. If the particle size is excessively large, the degree of impregnation of glass fibers with the resin is decreased. If the particle size is too small, the pressure loss in the dehydration process in the production of a web, which will be further described below, is increased, thereby sometimes causing production difficulty.

An example of previously fusing thermoplastic resin B to the particles of thermoplastic resin A comprises mixing in a Henschel mixer or the like. In this case, mixing and agitation are performed at a temperature above the melting point or softening point of thermoplastic resin B, and lower than the melting point or softening point of thermoplastic resin A. The melting point or softening point of thermoplastic resin B may be lower than the melting point or softening point of thermoplastic resin A. This coats resin B on the outer surfaces of resin particles A.

The amount of the thermoplastic resin B fused and coated may be adjusted so that the mean number of the functional groups in the matrix resin is finally within the range of about $3.0 \times 10^{17}$ to $6.0 \times 10^{19}$ (number of functional groups/weight of thermoplastic resin in grams). The amount of the thermoplastic resin B fused and coated is preferably controlled so that the ratio [(weight of thermoplastic resin B)/(weight of thermoplastic resin A)]$\times 100$ is within the range of about 0.1 to 5.0% by weight. With a ratio of less than about 0.1% by weight, there are difficulties in uniformly fusing to the surfaces of glass fibers. With a ratio of more than about 5.0% by weight, the thickness of thermoplastic resin B fused to the glass fiber surfaces is increased, thereby decreasing the strength due to deterioration of the mechanical properties of the matrix resin.

Thermoplastic resin C in an emulsion impregnated in a web is further described below. In a resin emulsion, a high-molecular weight substance is stably dispersed in an aqueous medium. The particle size of the emulsion is limited to about 2 µm or less, preferably about 1 µm or less, in order to fuse resin C uniformly to the glass fibers. With a particle size over about 2 µm, the resin C is nonuniformly fused to the glass fibers, thereby causing insufficient improvement of wettability and adhesion, and difficulties in unevenly distributing many functional groups on the glass fiber surfaces. Thus, the characteristics and effects of the present invention are not then most effectively realized.

Examples of the method of impregnating the emulsion in a web include either coating by a curtain coater or spraying using a spray, or others.

The amount of emulsion added is preferably controlled so that the value of the ratio [(weight of resin in emulsion)/(weight of glass fibers)] $\times 100$ is about 0.1 to 2% by weight, more preferably about 0.3 to 1.5% by weight. With a value of less than about 0.1% by weight, wettability and adhesion become insufficient and strength is not sufficiently improved. With a ratio of more than about 2% by weight, the amount of thermoplastic resin C unevenly distributed on the surfaces of the glass fibers is increased, thereby deteriorating the mechanical properties of the product.

The weight average molecular weight of thermoplastic resin A having no functional group in its molecule is preferably within the range of about 30,000 to 500,000. With a weight average molecular weight of less than about 30,000, although the melt viscosity is low, and wettability is high, the mechanical properties of the resulting product as a stampable material are poor because of brittleness. With a weight average molecular weight of more than about 500,000, the melt viscosity is high, and the fluidity in molding of a stampable material is decreased. The degree of impregnation of the thermoplastic resin in the glass fibers is also decreased, thereby deteriorating the mechanical properties of the product, as in the case of mixing with excess glass fibers. The weight average molecular weight of resin A is more preferably within the range of about 50,000 to 200,000.

Thermoplastic resin A and thermoplastic resins B and C, both of the latter of which contain functional groups in their molecules, are preferably the same type of resin when used together. If they are different types of resins, they preferably nevertheless have compatibility with each other. When compatibility between thermoplastic resin A and thermoplastic resins B and C is poor, the mechanical properties of the matrix resin as a mixture of these resins deteriorate, thereby deteriorating the mechanical properties of the product. The weight average molecular weights of thermoplastic resins B and C are preferably within the range of about 5000 to 150,000. With a weight average molecular weight of less than about 5000, the mixture becomes brittle, and the mechanical properties of the stampable material thus deteriorate, as described above. With a weight average molecular weight of more than about 150,000, the fluidity in molding of the stampable material is decreased. However, when the amounts of thermoplastic resins B and C mixed are very small, the effects of the molecular weights are of less importance.

The content of functional groups in thermoplastic resins B and C is preferably within the range of about $3.0 \times 10^{19}$ to $1.2 \times 10^{21}$, more preferably about $6.0 \times 10^{19}$ to $6.0 \times 10^{20}$ (number of functional groups/weight in a gram of thermoplastic resin B or C). With a content of less than about $3.0 \times 10^{19}$, the amount of brittle thermoplastic resin B or C mixed is inevitably increased, thereby deteriorating the mechanical properties of the product. With a content of more than $1.2 \times 10^{21}$, the amount of thermoplastic resin B or C mixed is inevitably decreased, and thus functional groups are not sufficiently dispersed on the glass fiber surfaces, thereby causing insufficient improvement of mechanical properties.

Each of these thermoplastic resins may comprise a plurality of thermoplastic resins having different molecular weights, types of functional groups and contents of functional groups.

An important method of producing a stampable material in accordance with this invention is described in detail below.

Glass fiber chopped strands and particles of a reactive thermoplastic resin, or particles of a resin composite obtained by previously fusing thermoplastic resin B to the surfaces of particles of thermoplastic resin A, are dispersed in an aqueous solution of a surfactant in which small air bubbles are dispersed. The dispersion is dehydrated through a porous supporting material to obtain a web in which the particles of the thermoplastic resin are uniformly mixed and dispersed with the glass fibers. The thickness of the thus-obtained web is generally about 1 to 10 mm. If desired or required, the web is then impregnated with an emulsion of thermoplastic resin C. After the web is dried, the resin is melted by heating the web at about the melting point or softening point of the thermoplastic resin, followed by pressing between cooling boards, to obtain a dense solidified stampable material.

The heating temperature of the web must be controlled to be lower than the decomposition temperature of the thermoplastic resin. When the thermoplastic resin is polypropylene, the heating temperature is preferably about 170° to 230° C., more preferably about 190° to 210° C. With a heating temperature higher than about 230° C., coloring and deterioration of mechanical properties tend to occur due to decomposition of polypropylene.

The pressure applied in pressing the web between the cooling boards is preferably about 3 to 500 kgf/cm$^2$, for densifying the web. Excess pressure may bring about breakage of the glass fibers.

The stampable material can contain additives and a coloring agent such as an antioxidant, a weathering stabilizer, a metal deactivator, a copper inhibitor, a flame retardant, carbon black and so on. These additives and coloring agent can be contained in the stampable material, for example, by previously mixing in the thermoplastic resin, adding at the same time thermoplastic resins A and B mixed and fused, or adding by spraying in the process of production.

A molding method according to this invention is described below.

After the stampable material has been heated at a temperature higher than the melting point or softening point of the thermoplastic resin and lower than the decomposition temperature thereof, the material is placed on a mold and then pressed for shaping. When the thermoplastic resin is polypropylene, the heating temperature is preferably about 170° to 230° C.

The mold temperature may be lower than the solidification point of the thermoplastic resin. From the viewpoints of handling properties and productivity, the mold temperature is generally about room temperature to 60° C.

Although the molding pressure depends upon the product shape, the pressure is generally about 50 to 500 kgf/cm$^2$.

Although the present invention may be applied to a stampable material formed by the so-called "papermaking" method, as described above, the scope of the present invention is not limited to this specific method, and can be applied to any process for impregnation of a glass fiber mat with a thermoplastic resin.

EXAMPLES

The present invention is described in detail below with reference to examples.

[Example 1-1]

The following two resins were prepared as matrix resins:

Thermoplastic resin A: polypropylene (white particles, average particle size of 800 μm, weight average molecular weight of 150000, melting point of 165° C.).

Thermoplastic resin B: maleic anhydride-modified polypropylene [yellow, average particle size of 2 mm, amount of maleic anhydride modification of 10.0% by weight (the mean number of acid anhydride group is $6.0 \times 10^{20}$ per gram of resin B, the number of carboxyl group derived from acid anhydride is calculated as an acid anhydride group), weight average molecular weight of 12000, melting point of 142° C.].

96.5 parts by weight of particles of thermoplastic resin A and 3.5 parts by weight of particles of thermoplastic resin B were charged in a Henschel mixer (produced by Mitsui-Miike Kogyo, 201), and mixed and agitated by an agitating element at a peripheral speed of 25 m/s at a temperature of 142° C. at highest for 30 minutes to obtain a resin particle composite with an average particle size of 800 μm in which thermoplastic resin B was fused as a film on the particles of thermoplastic resin A. 33.75 g of the resin particle composite (the total number of acid anhydride groups is $2.1 \times 10^{19}$ per gram of the resin composite) and 22.50 g of glass fiber chopped strands (containing 0.06% by weight of aminosilane coupling agent) having an average fiber length of 13 mm and average fiber diameter of 10 μm were agitated in 10 liters of 0.8% by weight of surfactant aqueous solution, and bubbled to prepare a dispersion. The thus-prepared dispersion was poured into a paper machine having a paper area of 250×250 mm, and deaerated under suction to produce a web having a weight of 900 g/m$^2$. The web was then dried at 130° C. for 90 minutes. Three webs having a weight of 900 g/m$^2$ were further produced by the same method as that described above. The four webs were laminated, pre-heated at 210° C. and then placed between cooling boards at 25° C. The webs were then pressed under a pressure of 5 kgf/cm3 to obtain a solidified dense glass-fiber-reinforced thermoplastic resin composite material (stampable material). A bending test specimen was cut from the central portion of the stampable material in accordance with JIS K7055. The bending strength was measured by bending tests of three specimens. The results obtained are shown in Table 1.

The thus-obtained stampable material was cut at an angle to the orientation axis of the reinforcing glass fibers to obtain a thin film. The thin film was used for measuring the concentration of functional groups in the matrix resin from the absorption (1785 cm$^{-1}$) arising from acid anhydride groups and the absorption (1710 cm$^{-1}$) arising from carboxyl groups (by comparison with the absorption at 840 cm$^{-1}$ of C—H out-of-plane deformation vibration) by using a microscopic IR (Fourier-transform infrared spectrophotometer Micro FTIR-100 model, produced by Nihon Bunko-kogyo). The measurement range was a square of about 25 μm (about 10 μm in terms of the vertical distance from the glass fiber surface). The concentration of functional groups was measured at intervals of 10 μm in the vertical direction from the matrix resin in proximity to the glass fiber surface. The results obtained are shown in Table 2.

[Comparative Example 1-1]

A stampable material was obtained by the same method as that employed in Example 1-1 except that the process of fusing thermoplastic resin B to the particles of thermoplastic resin A was omitted, and 33.75 g of particles of thermoplastic resin A was used in place of the resin composite. Resin A had no significant content of functional groups bondable to glass fiber silane bonding agents.

The bending strength, bending modulus and concentration of functional groups were measured by the same methods as those employed in Example 1-1. The obtained results are shown in Tables 1 and 2. The bending strength of this comparative example is shown by the lone black dots in FIGS. 1 and 2.

[Example 1-2]

A stampable material was obtained by the same method as that employed in Example 1-1 except that the following resin was used as thermoplastic resin B:

Thermoplastic resin B: maleic anhydride-modified polypropylene [yellow, average particle size of 2 mm, the amount of maleic anhydride modification 5.0% by weight (the mean number of acid anhydride group is $3.0 \times 10^{20}$ per gram of resin B, the number of carboxyl group derived from acid anhydride is calculated as an acid anhydride group), weight average molecular weight of 27000, melting point of 151° C.].

The bending strength, bending modulus and concentration of functional groups were measured by the same methods as those employed in Example 1-1. The color of the sheet surface was also observed. The obtained results are shown in Tables 1 and 2.

[Comparative Example 1-2]

A stampable material was obtained by the same method as that employed in Example 1-2 except that the process of fusing thermoplastic resin B to the particles of thermoplastic resin A was omitted, and 32.57 g of particles of thermoplastic resin A and 1.18 g of particles of thermoplastic resin B were used in place of the resin composite.

The bending strength, bending modulus and concentration of functional groups were measured by the same method as that employed in Example 1-2. The color of the sheet surface was also observed. The obtained results are shown in Tables 1 and 2.

[Comparative Example 1-3]

In this Comparative Example, the step of fusing the thermoplastic resin B onto the particles of the thermoplastic resin A was omitted but these two kinds of thermoplastic resins were molten and kneaded by a twin screw extruder at a kneading temperature of 200° C. and for a residential time of 1 minute. The kneaded material was then crushed and pulverized into mixture resin particles having a mean particle size of 1 μm. Stamping material was formed in the same method a Example 2-1, except for the above-described preparatory steps, an samples of thus-formed stamping material were subjected to the measurement of bending strength, bending modulus and average number of functional groups conducted under the same conditions as Example 1-2, as well as to observation of the sheet color. The results are shown in Tables 1 and 2.

[Example 1-3]

A stampable material was obtained by the same method as that employed in Example 1-1 except that the following resin was used as thermoplastic resin B:

Thermoplastic resin B: maleic acid-modified polypropylene [yellow, average particle size of 2 mm, the amount of maleic acid modification of 5.0% by weight(number of carboxyl group is $5.1 \times 10^{20}$ per gram of resin B), weight average molecular weight of 27000, melting point of 151° C.].

The bending strength, bending modulus and concentration of functional groups were measured by the same method as that employed in Example 1-1. The color of the sheet surface was also observed. The obtained results are shown in Tables 1 and 2.

TABLE 1

| No. | Bending Strength (kgf/mm$^2$) | | Bending Modulus (kgf/mm$^2$) | | Color of Sheet Surface |
|---|---|---|---|---|---|
| | Average | Standard Deviation | Average | Standard deviation | |
| Example 1-1 | 16.20 | 0.21 | 640 | 20 | Uniform Light Yellow |
| Example 1-2 | 15.51 | 0.16 | 610 | 13 | Uniform Light Yellow |
| Example 1-3 | 15.03 | 0.18 | 600 | 12 | Uniform Light Yellow |
| Comparative Example 1-1 | 7.14 | 0.45 | 400 | 30 | White |
| Comparative Example 1-2 | 11.50 | 1.31 | 520 | 50 | Yellow Spots |
| Comparative Example 1-3 | 13.95 | 0.23 | 560 | 25 | Uniform Light Yellow |

TABLE 2

| Distance from Glass Fiber Surface (μm) | Mean Number of Functional Groups near Glass Fiber × $10^{18}$ (number/gram) | | | | | |
|---|---|---|---|---|---|---|
| | Example 1-1 | Example 1-2 | Example 1-3 | Comparative Example 1-1 | Comparative Example 1-2 | Comparative Example 1-3 |
| 0–10 | 509 | 284 | 487 | 0 | 0 | 9 |
| 10–20 | 365 | 210 | 321 | 0 | 2 | 10 |
| 20–30 | 211 | 83 | 190 | 0 | 21 | 15 |
| 30–40 | 32 | 19 | 31 | 0 | 105 | 5 |
| 40–50 | 24 | 16 | 19 | 0 | 210 | 31 |
| Average number of Functional Groups of Matrix Resin in All stampable Material* | 21 | 11 | 18 | 0 | 10 | 11 |

*Mean number of functional groups in matrix resin forming stampable material

It was found from this example that the obtained stampable material had a concentration of functional groups which was high at the glass fiber surface and gradually decreased in the matrix resin. It was also found that the stampable material had a high bending strength and bending modulus and small variations thereof.

The obtained sheet exhibited significant improvement in mechanical properties, less coloring caused by addition of thermoplastic resin B, uniform hue and good appearance, as compared with Comparative Examples in which particles of thermoplastic resin A and functional group-containing thermoplastic resin B were simply mixed.

In addition, mechanical properties were superior to those obtained with the Comparative Examples which were prepared by melting and kneading the thermoplastic resin A and the functional group-containing thermoplastic resin B in advance.

[Example 2-1]

The following two resins were prepared as matrix resins:

Thermoplastic resin A: polypropylene (white particles, average particle size of 800 μm, weight average molecular weight of 150,000, melting point of 165° C.).

Thermoplastic resin C: emulsion of maleic anhydride-modified polypropylene (0.5% of effective component, yellow solid content, average particle size of 0.8 μm, an amount of maleic anhydride modification of 10.0% by weight (the mean number of acid anhydride group is $6.0 \times 10^{20}$ per gram of resin B, the number of carboxyl group derived from acid anhydride is calculated as an acid anhydride group), weight average molecular weight of 12000, softening point of 142° C.].

33.75 g of thermoplastic resin A and 22.50 g (the amount of the glass fibers contained in a stampable material of 40% by weight) of glass fiber chopped strands (containing 0.06% by weight of aminosilane coupling agent) having an average fiber length of 13 mm and an average fiber diameter of 10 μm were agitated in 10 liters of 0.8% by weight of surfactant aqueous solution, and bubbled to prepare a dispersion. The thus-prepared dispersion was poured into a web-making machine having a web area of 250×250 mm, and deaerated under suction to produce a web having a weight of 900 g/m². The web was then impregnated with 67.50 g of emulsion of thermoplastic resin C by spraying [the yield of thermoplastic resin C, contained in the emulsion and present in the web, was 100% and the total number of the functional groups was $3.7 \times 10^{18}$ per gram of the matrix resin.

The web was then dried at 130° C. for 90 minutes. Three webs having a weight of 900 g/m² were further produced by the same method as that described above. The four webs were laminated, pre-heated at 210° C. and then placed between cooling boards at 25° C. The webs were then pressed at 5 kgf/cm³ to obtain a solidified dense stampable material. The bending strength, bending modulus, sheet hue and concentration of functional groups were measured by the same methods as those employed in Example 1-1. The results obtained are shown in Tables 3 and 4.

[Example 2-2]

A stampable material was obtained by the same method as that employed in Example 2-1 except that the following resin was used as an emulsion of thermoplastic resin C.

Thermoplastic resin C: emulsion of maleic acid-modified polypropylene [0.5% of effective component, yellow solid content, average particle size of 0.2 μm, the amount of maleic acid modification of 5.0% by weight(number of carboxyl groups was $5.1 \times 10^{20}$ per gram of resin C), weight average molecular weight of 27000, softening point of 151° C.].

The bending strength, bending modulus, sheet hue and concentration of functional groups were measured by the same methods as those employed in Example 2-1. The results are shown in Tables 3 and 4.

[Comparative Example 2-1]

A stampable material was obtained by the same method as that employed in Example 2-2 except that thermoplastic resin C was used as a single resin, not an emulsion, and mixed in an amount of 0.34 g (corresponding to the mixing amount of thermoplastic resin C of Examples 2-2) with thermoplastic resin A. The bending strength, bending modulus, sheet hue and concentration of functional groups were measured by the same methods as those employed in Example 2-2. The results are shown in Tables 3 and 4.

[Comparative Example 2-2]

A stampable material was obtained by the same method as that employed in Example 2-2 except that an emulsion of thermoplastic resin C having an average particle size of 3.0 μm was used.

The bending strength, bending modulus, and sheet hue were measured by the same methods as those employed in Example 2-2. The results are shown in Table 3.

TABLE 3

| No. | Bending Strength (kgf/mm²) | | Bending Modulus (kgf/mm²) | | Color of Sheet Surface |
|---|---|---|---|---|---|
| | Average | Standard Deviation | Average | Standard deviation | |
| Example 2-1 | 13.18 | 0.21 | 600 | 20 | Uniform Light Yellow |
| Example 2-2 | 15.43 | 0.19 | 630 | 21 | Uniform Light Yellow |
| Comparative Example 2-1 | 11.97 | 1.45 | 540 | 58 | Yellow spots |
| Comparative Example 2-2 | 11.50 | 0.28 | 480 | 28 | Uniform Light Yellow |

TABLE 4

| Distance from Glass Fiber Surface (μm) | Mean Number of Functional Groups near Glass Fiber Surface × $10^{18}$ (number/g) | | |
|---|---|---|---|
| | Example 2-1 | Example 2-2 | Comparative Example 2-1 |
| 0–10 | 491 | 407 | 0 |
| 10–20 | 402 | 281 | 0 |
| 20–30 | 113 | 53 | 50 |
| 30–40 | 24 | 8 | 231 |
| 40–50 | 21 | 4 | 102 |
| Average Number of Functional Groups in Matrix Resin | 4 | 3 | 4 |

It was factually established by this example that the obtained stampable material had a concentration of functional groups which was higher at the glass fiber surface and gradually decreased with distance away from the glass fiber surface and into the matrix resin. It was also established that the resulting stampable material had high bending strength and bending modulus and small variations thereof.

The stampable sheet exhibited significant improvement in mechanical properties, less coloring caused by addition of thermoplastic resin C, uniform hue and good appearance, as compared with the associated Comparative Examples in which particles of thermoplastic resin A and functional group-containing thermoplastic resin C were simply mixed. When the particle size of the emulsion was excessively large, the mechanical properties were only slightly improved.

[Example 3]

The following three resins were prepared as matrix resins:

Thermoplastic resin A: polypropylene (weight average molecular weight of 150,000, melting point of 165° C.)

Thermoplastic resin B: maleic anhydride-modified polypropylene [maleic anhydride modification of 10.0 wt % (the mean number of acid anhydride group is $6.0 \times 10^{20}$ per gram of resin B, the number of carboxyl group derived from acid anhydride is calculated as an acid anhydride group), weight average molecular weight of 32,000, melting point of 142° C.]

Thermoplastic resin C: an emulsion of the same resin as thermoplastic resin B except that the average particle size was 0.8 μm, and the effective ingredient was 5.0% by weight.

96.8 parts by weight of particles of thermoplastic resin A and 3.2 parts by weight of particles of thermoplastic resin B were charged in a Henschel mixer, and mixed and agitated at a temperature of 142° C. to obtain a resin particle composite having an average particle size of 800 μm in which thermoplastic resin B was fused in a film to the surfaces of particles of thermoplastic resin A. 30.00 g of the resin particle composite and 22.50 g (the stampable material contained 40% by weight of glass fibers) of glass fiber chopped strands (containing 0.06% by weight of aminosilane coupling agent) having an average fiber length of 13 mm and an average fiber diameter of 10 μm were agitated in 10 liters of 0.8% by weight surfactant aqueous solution, and bubbled to prepare a dispersion. The thus-prepared dispersion was poured into a web-making machine having a web area of 250×250 mm, and deaerated under suction to produce a web having a weight of 900 g/m². The web was then impregnated with 15.00 g of emulsion of thermoplastic resin C by spraying [the yield of thermoplastic resin C, contained in the emulsion and present in the web, was 100% and the total number of functional groups (acid anhydride groups+ carboxyl groups) contained in the matrix resin was $2.0 \times 10^{19}$ per gram].

The web was then dried at 130° C. for 90 minutes. Three webs having a weight of 900 g/m² were further produced by the same method as that described above. The four webs were laminated, pre-heated at 210° C. and then placed between cooling boards at 25° C. The webs were then pressed under a pressure of 5 kgf/cm3 to obtain a solidified dense glass-fiber-reinforced thermoplastic resin composite material (stampable material). Bending strength and number of functional groups were measured by the same method as Example 1-1. The number of functional groups was calculated on the basis of the above result, and is shown in Table 5.

TABLE 5

| Distance from Glass Fiber Surface (μm) | 0–10 | 10–20 | 20–30 | 30–40 | 40–50 |
|---|---|---|---|---|---|
| Average Number of Functional Groups × | 575 | 326 | 283 | 31 | 22 |

TABLE 5-continued

| Distance from Glass Fiber Surface (μm) | 0–10 | 10–20 | 20–30 | 30–40 | 40–50 |
|---|---|---|---|---|---|
| $10^{18}$ (number/g) | | | | | |

It was found that the concentration of functional groups in the matrix resin was high at the glass fiber surface, and that the concentration of functional groups in a portion in proximity to the glass fibers was 10 times or more the mean number of functional groups ($2.0 \times 10^{18}$ per gram) of the matrix resin. It was also confirmed that the concentration of functional groups gradually decreased in the matrix resin with increased distance from the glass fiber surface.

Stampable materials were also produced by the same method as that described above except that the amounts of thermoplastic resin B and thermoplastic resin C were changed with the same ratio so that the mean number of functional groups [acid anhydride groups] contained in the matrix resin was within the range of $3.0 \times 10^{17}$ to $1.2 \times 10^{20}$ (number of functional groups/weight of thermoplastic resin in grams). The stampable materials were evaluated by the same method as that described above. The relationship between the mean number of the functional groups contained in the matrix resin and bending strength was examined. The results are summarized in FIG. 1.

[Comparative Example 3]

A stampable material was produced by the same method as that employed in Example 3 except that glass fiber chopped strands not treated with aminosilane coupling agent were used as reinforcing glass fibers, and evaluated by the same method. The results are shown by triangles in FIG. 1. FIG. 1 also shows the results of an example (black dot) in which no functional group was added.

[Example 3-1]

The following two glass fibers were prepared as glass fiber chopped strands:

Glass fiber chopped strands A (the same as the glass fibers used in Example 3): an average length of 13 mm, an average fiber diameter of 10 μm, 0.06% by weight aminosilane coupling agent, 0.05% by weight ethylene oxide sizing agent, the number of the fibers collected being 5000/bundle.

Glass fiber chopped strands B: an average length of 13 mm, an average fiber diameter of 10 μm, 0.1% by weight aminosilane coupling agent, 1.0% by weight urethane sizing agent, the number of the fibers collected being 70/bundle.

Although glass fiber chopped strands A were opened into single fibers in the paper forming process, glass fiber chopped stands B maintained their initial bundle form.

A stampable material was produced by the same method as that employed in Example 3 except that 11.25 g of glass fiber chopped strands A and 11.25 g of glass fiber chopped strands B were used in place of the reinforcing glass fibers used in a case wherein the mean number of the functional groups was $2.0 \times 10^{19}$ per gram of the matrix resin. The thus-produced stampable material was subjected to the bending test. The results of bending strength and bending modulus, and the state of split glass fibers are shown in Table 6.

[Example 3-2]

A stampable material was produced by the same method as that employed in Example 3 except that 22.5 g of glass fiber chopped strands B was used in place of the reinforcing glass fibers used in a case wherein the mean number of the functional groups was $2.0 \times 10^{19}$ per group of the matrix resin. The thus-produced stampable material was subjected to the bending test. The results of bending strength and bending modulus, and the open state of glass fibers are shown in Table 6.

TABLE 6

| No. | Bending Strength (kgf/mm²) | Bending Modulus (kgf/mm²) | Open State of Glass Fibers |
|---|---|---|---|
| Example 3 | 19.2 | 685 | All fibers were opened. |
| Example 3-1 | 17.6 | 625 | About half fibers were collected. |
| Example 3-2 | 16.0 | 580 | All fibers were collected. |

Even when the degree of opening of the glass fibers was changed, the stampable material of the present invention exhibited excellent mechanical properties. The use of the glass fibers collected improved the fluidity of the stampable material, i.e., the moldability thereof, with increases in the ratio of glass fibers.

[Example 4]

The following three resins were prepared as matrix resins:

Thermoplastic resin A: polypropylene (a weight average molecular weight of 150,000, a melting point of 165° C.)

Thermoplastic resin B: hydroxyl group-modified polypropylene [number of hydroxyl groups was $4.1 \times 10^{20}$ per gram of the resin B, a weight average molecular weight of 45,000, a melting point of 152° C.]

Thermoplastic resin C: emulsion of maleic anhydride-modified polypropylene [maleic anhydride modification of 10.0 wt % (the mean number of acid anhydride group is $6.0 \times 10^{20}$ per gram of resin B, the number of carboxyl group derived from acid anhydride is calculated as an acid anhydride group), number of carboxyl groups was $1.2 \times 10^{20}$ per gram of resin C, a weight average molecular weight of 32,000, a melting point of 142° C., an average particle size of about 0.8 μm, 5.0 wt % effective ingredient].

94.7 parts by weight of particles of thermoplastic resin A and 5.3 parts by weight of particles of thermoplastic resin B were charged into a Henschel mixer and mixed and agitated at a temperature of 152° C. to obtain a resin particle composite having an average particle size of 800 μm in which thermoplastic resin B was fused in a film to particles of thermoplastic resin A. 30.00 g of the resin particle composite and 22.50 g (the stampable material contained 40% by weight of glass fibers) of glass fiber chopped strands (containing 0.08% by weight of epoxysilane coupling agent) having an average fiber length of 13 mm and average fiber diameter of 10 μm were agitated in 10 l of 0.8% by weight of surfactant aqueous solution and bubbled to prepare a dispersion. The thus-prepared dispersion was poured into a web-making machine having a web area of 250×250 mm, and deaerated under suction to produce a web having a weight of 900 g/m². The web was then impregnated with 15.00 g of emulsion of thermoplastic resin C by spraying

[the yield of thermoplastic resin C, contained in the emulsion and present in the web, was 100% and the total number of functional groups was $2.2 \times 10^{19}$ per gram of the matrix resin].

The web was then dried at 130° C. for 90 minutes. Three webs having a weight of 900 g/m² were further produced by the same method as that described. The four webs are laminated, pre-heated at 210° C. and then placed between cooling boards at 25° C. The webs were then pressed under a pressure of 5 kgf/cm3 to obtain a solidified dense glass-fiber-reinforced thermoplastic resin composite material (stampable material). A bending test specimen was cut from the central portion of the stampable material in accordance with JIS K7055. The bending strength was measured by bending tests of three specimens.

Stampable materials were also produced by the same method as that described above except that the amounts of thermoplastic resin B and thermoplastic resin C were changed with the same ratio so that the total number of functional groups [hydroxy groups+ acid anhydride groups] was $3.0 \times 10^{17}$ to $1.2 \times 10^{20}$ per gram of the matrix resin. The stampable materials were evaluated by the same method as that described above. The relation between the mean number of the functional groups contained in the matrix resin and bending strength was examined. The obtained results are summarized in FIG. 2.

[Comparative Example 4]

Figure 2:
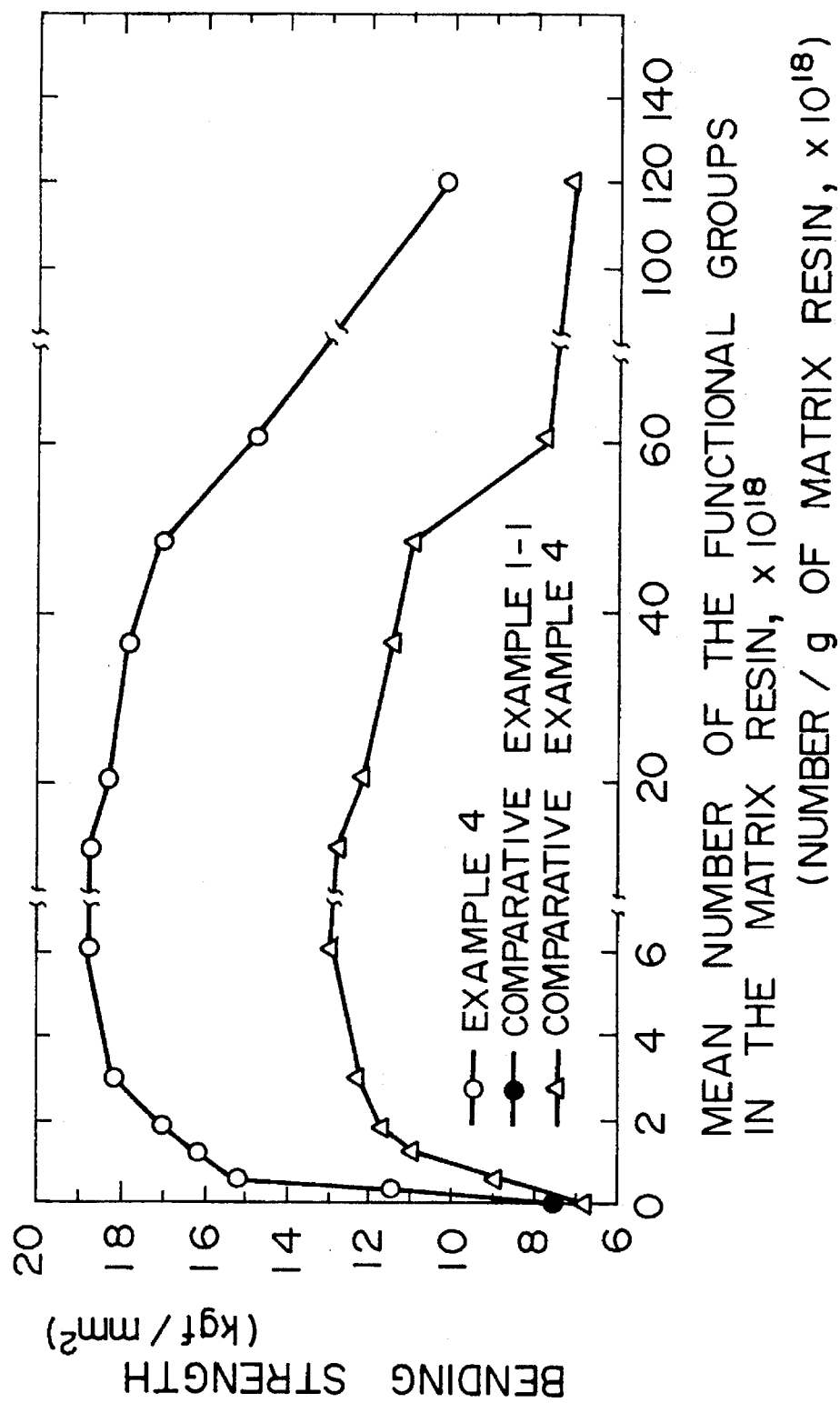

A stampable material was produced by the same method as that employed in Example 4 except that glass fiber chopped strands which were not treated with epoxysilane coupling agent were used as reinforcing glass fibers, and evaluated by the same method. The results are shown in FIG. 2. FIG. 2 also shows the results of an example in which no functional group was added.

When functional groups which can combine with the silane coupling agent are present by adding thermoplastic resin B and thermoplastic resin C to the matrix resin, the bending strength is significantly improved. However, when the amount of the thermoplastic resins added is too small or excessive, the bending strength is only slightly improved.

The combination of thermoplastic resins A, B and C, as shown in Examples, can attain high bending strength. The bending strength is maximum in the presence of glass fibers treated with the silane coupling agent at the mean number of the functional groups contained in the matrix resin within the range of about $3.0 \times 10^{17}$ to $6.0 \times 10^{19}$ per gram of matrix resin, particularly within the range of about $3.0 \times 10^{18}$ to $4.0 \times 10^{19}$ per gram of the matrix resin.

[Example 5]

Figure 3:
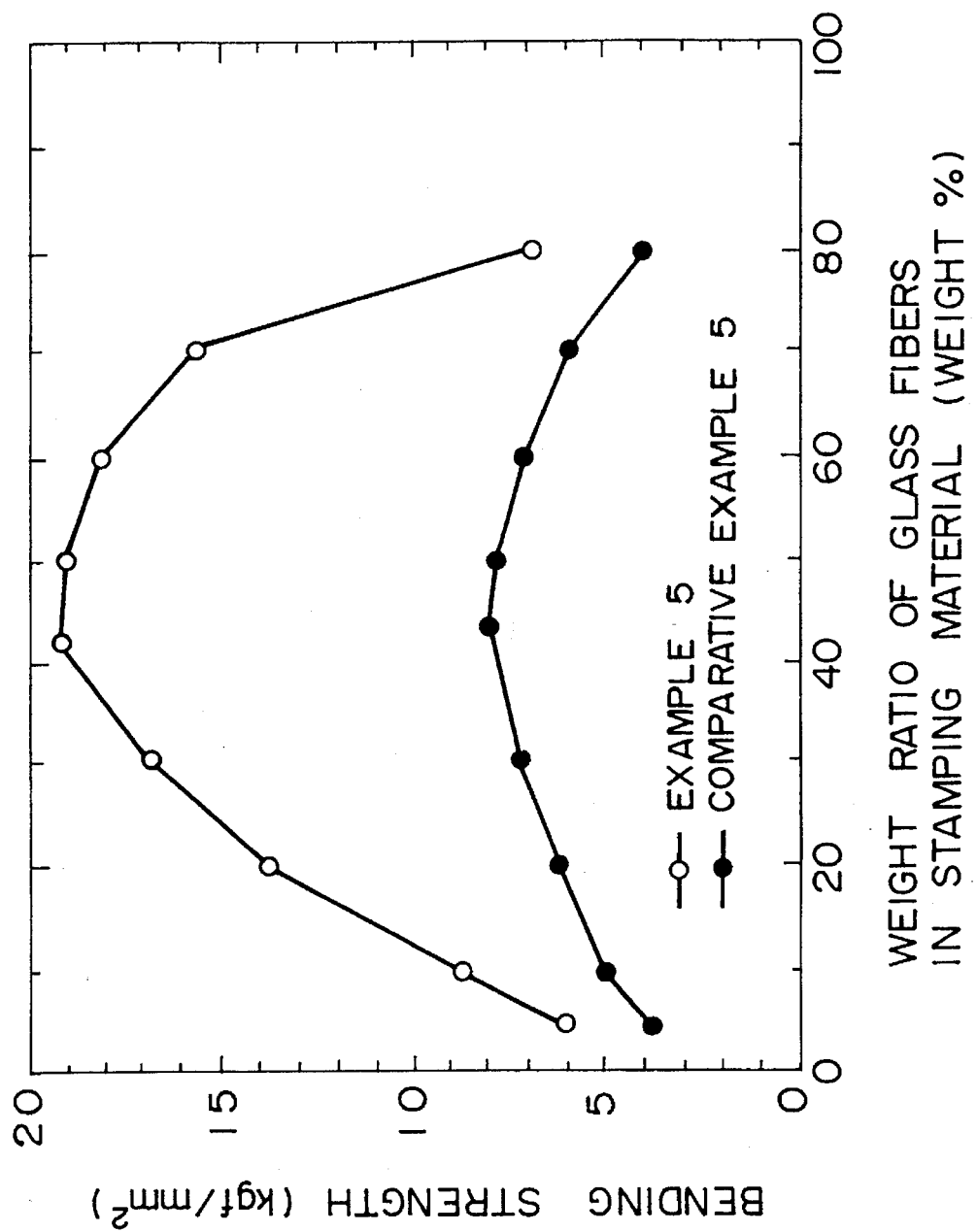
FIG. 3 is a graph showing relationships between the weight ratios of glass fibers to the total weight of stampable materials.

Stampable materials were produced by the same method as that employed in Example 3 except that the weight of the glass fibers contained in the sampling material of the case where the mean number of the functional groups was $2.0 \times 10^{19}$ per gram of the matrix resin was changed within the range of 5 to 80% by weight. The relation between the weight of the glass fibers contained in a stampable material and bending strength was examined. The results are shown in FIG. 3.

[Comparative Example 5]

Only thermoplastic resin A was used as a matrix resin, and neither thermoplastic resins B nor C were used. The relation between the weight of the glass fibers contained in the obtained stampable material and bending strength was examined. The results are shown in FIG. 3.

The results show that high bending strength appears when the ratio by weight of the glass fibers contained in the stampable material of the present invention is about 20 to 70 % by weight.

The stampable material of the present invention had excellent fluidity and caused no problem in molding various automotive products, such as bumper beams, and so on.

The present invention provides a stampable material and a method of producing the same having excellent bending strength and mechanical properties. Thus the present invention can advantageously be applied to many advantageous structural components required to have high strength and rigidity, e.g., automotive members such as a bumper beams, etc.

What is claimed is:

1. A method of producing a glass fiber reinforced polymeric material which excels in mechanical properties, which comprises:

preparing a dispersion liquid by dispersing, in a surfactant-containing aqueous medium containing fine bubbles of air dispersed therein, a plurality of reinforcement glass fibers which include a silane coupling agent, and a composite resin comprising particles of (A) a thermoplastic resin which does not contain a significant amount of a functional group that is bondable to said silane coupling agent and (B) a thermoplastic resin which contains about $3.0 \times 10^{19}$ to $1.2 \times 10^{21}$ of a functional group per gram that is bondable to said silane coupling agent and is chemically compatible with resin (A), said resin (B) being fused to the surfaces of said particles of said thermoplastic resin (A) by mixing and agitating said resins (A) and (B) at a temperature above a melting temperature of resin (B) and below a melting temperature of resin (A), thereby forming said composite resin having a particle size range of about 50 to 2000 μm, a weight ratio of resin (B) to resin (A) within a range of about 0.1 to 5.0%, and improved interfacial adhesion with said glass fibers as compared with resin (A) uncoated; contacting said dispersion liquid on a porous support to form a sheet-like web; and applying heat and pressure to said web and thereafter solidifying said web in a form of a sheet.

2. A method according to claim 1, wherein the content of said reinforcement glass fibers ranges from about 20 to 70 wt % of the total.

3. A method according to claim 1, wherein the mean number of said functional groups bondable to said silane coupling agent is from about $3.0 \times 10^{17}$ to $6.0 \times 10^{19}$ per gram of said composite resin.

4. A method according to claim 1, wherein the number of said functional groups in said thermoplastic resin which contains significant amounts of functional groups that are bondable to said silane coupling agent is from about $3.0 \times 10^{19}$ to $1.2 \times 10^{21}$ per gram of said resin B.

5. A method according to claim 1, wherein said thermoplastic resin (A) and said thermoplastic resin (B) are both polypropylene, and said functional group is at least one selected from the group consisting of an acid anhydride group, a carboxyl group and a hydroxyl group.

6. A method of producing a glass fiber reinforced polymeric material, which comprises:

preparing a dispersion liquid by dispersing, in a surfactant-containing aqueous medium containing fine bubbles of air dispersed therein, a plurality of reinforcement glass fibers which include a silane coupling agent, and a composite resin comprising particles of (A) a thermoplastic resin which does not contain a significant amount of a functional group that is bondable to said silane coupling agent and (B) a thermoplastic resin fused to the surfaces of the particles of said thermoplastic resin (A) by mixing and agitating said resins (A) and (B) at a temperature above a melting temperature of resin (B) and below a melting temperature of resin (A), said resin (B) containing about $3.0 \times 10^{19}$ to $1.2 \times 10^{21}$ of a functional group per gram that is bondable to said silane coupling agent and being chemically compatible with resin (A), such that a composite resin is formed having a particle size range of about 50 to 2000 μm, a weight ratio of resin (B) to resin (A) ranging from about 0.1 to 5.0%, and improved interfacial adhesion with said glass fibers as compared with resin (A) uncoated; contacting said dispersion liquid on a porous support so as to form a sheet-like web; impregnating said web with an emulsion of finely-divided thermoplastic resin particles containing a functional group in the range of about $3.0 \times 10^{19}$ to $1.2 \times 10^{21}$ per gram of resin that is bondable to said silane coupling agent, said emulsion particles having a particle size not greater than about 2 μm, the amount of emulsion added being controlled such that the weight ratio of resin in the emulsion to glass fibers is within a range of about 0.1 to 2%; and applying heat and pressure to said web and thereafter solidifying said web.

7. A method according to claim 6, wherein said thermoplastic resin (A), said thermoplastic resin (B) and said thermoplastic resin emulsion are all polypropylene, and said functional group is at least one selected from the group consisting of an acid anhydride group, a carboxyl group and a hydroxyl group.

* * * * *

UNITED STATES PATENT AND TRADEMARK OFFICE
CERTIFICATE OF CORRECTION

PATENT NO. : 5,529,808
DATED : June 25, 1996
INVENTOR(S) : Kunihiko Eguchi, Masafumi Komatsu, Seiji Hanatani, Yuichi Uchida, Tomoshige Ono and Tadahiro Wakui It is certified that error appears in the above-indentified patent and that said Letters Patent is hereby corrected as shown below:

On title page, "7 Claims, 3 Drawing Sheets" should read --6 Claims, 3 Drawing Sheets--.
In Column 22, lines 53 through 57, please delete Claim 4 in its entirety.

Signed and Sealed this

Eighth Day of October, 1996

Attest:

BRUCE LEHMAN

*Attesting Officer*         *Commissioner of Patents and Trademarks*